United States Patent [19]

Drechsel

[11] 4,160,657
[45] Jul. 10, 1979

[54] PREPARATION OF MONOCALCIUM PHOSPHATE AND PHOSPHORIC ACID

[75] Inventor: Erhart K. Drechsel, Houston, Tex.

[73] Assignee: Pennzoil Company, Shreveport, La.

[21] Appl. No.: 930,147

[22] Filed: Aug. 2, 1978

Related U.S. Application Data

[60] Continuation-in-part of Ser. No. 870,814, Jan. 19, 1978, which is a division of Ser. No. 608,973, Aug. 29, 1975, Pat. No. 4,086,322, which is a continuation-in-part of Ser. No. 512,877, Oct. 7, 1974, abandoned.

[51] Int. Cl.² .............................................. C05B 11/10
[52] U.S. Cl. ................................. 71/41; 71/DIG. 3; 423/158; 423/167; 423/309; 423/319
[58] Field of Search ................ 71/41, 33, 34, DIG. 3; 423/167, 309, 319, 158

[56] References Cited

U.S. PATENT DOCUMENTS

| | | | |
|---|---|---|---|
| 3,110,562 | 11/1963 | Hinkle, Jr. | 71/DIG. 3 |
| 3,512,927 | 5/1970 | Betts | 423/320 |
| 3,554,694 | 1/1971 | Barker et al. | 423/196 |
| 3,792,151 | 2/1974 | Case | 423/320 |
| 3,795,728 | 3/1974 | Scheel | 423/166 |
| 3,840,640 | 10/1974 | Drechsel | 423/167 |
| 4,086,322 | 4/1978 | Drechsel | 423/166 |

OTHER PUBLICATIONS

"Fluorine Recovery from Phosphate Rock Concentrates," Bureau of Mines Report of Investigations/1977.
Drechsel, "Phosphate Conversion—A New Perspective," paper presented to the American Chemical Society (Sep. 1, 1976).

Primary Examiner—O. R. Vertiz
Assistant Examiner—Wayne A. Langel
Attorney, Agent, or Firm—Lowe, King, Price & Becker

[57] ABSTRACT

Monocalcium phosphate, phosphoric acid and/or potassium phosphate containing fertilizers are produced in a process involving acidulation of phosphate rock with phophoric acid in the presence of added silicon dioxide and potassium ion whereby fluorides contained in the rock are converted to $K_2SiF_6$, wherein monocalcium phosphate dissolved in phosphoric acid is formed during acidulation. In an important feature, the $K_2SiF_6$ is separated and hydrolyzed to regenerate the $K_2O$ from $K_2SiF_6$ as recycled $KH_2PO_4/H_3PO_4$ solution for further reaction with fluoride from fresh phosphate rock feed. A portion of the $MCP/H_3PO_4$ solution and/or crystallized monocalcium phosphate can then be reacted with potassium sulfate, potassium bisulfate, or mixtures thereof, to form $KH_2PO_4$, or $KH_2PO_4/H_3PO_4$ solutions, and gypsum. In a closely related embodiment, the remaining $MCP/H_3PO_4$ solution is reacted with sulfuric acid to produce phosphoric acid product and/or the recycle phosphoric acid required in the phosphate rock acidulation step.

15 Claims, 2 Drawing Figures

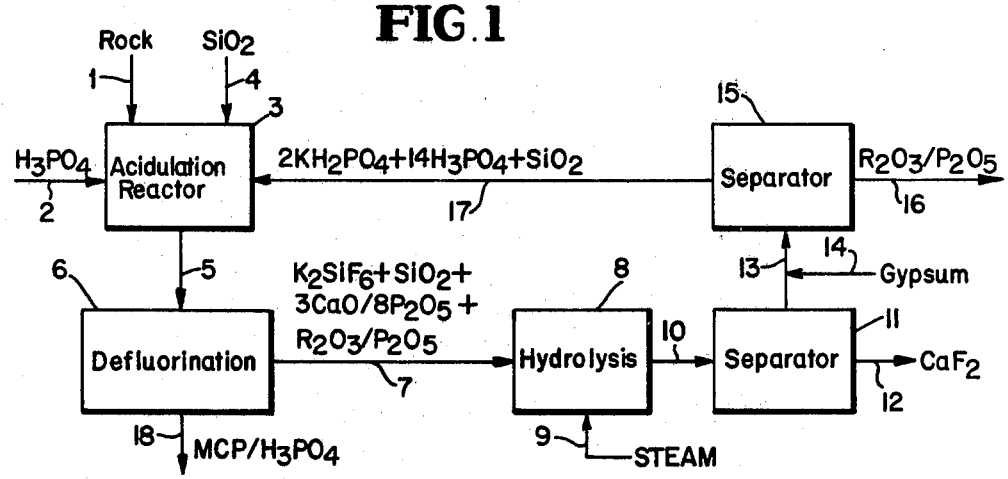
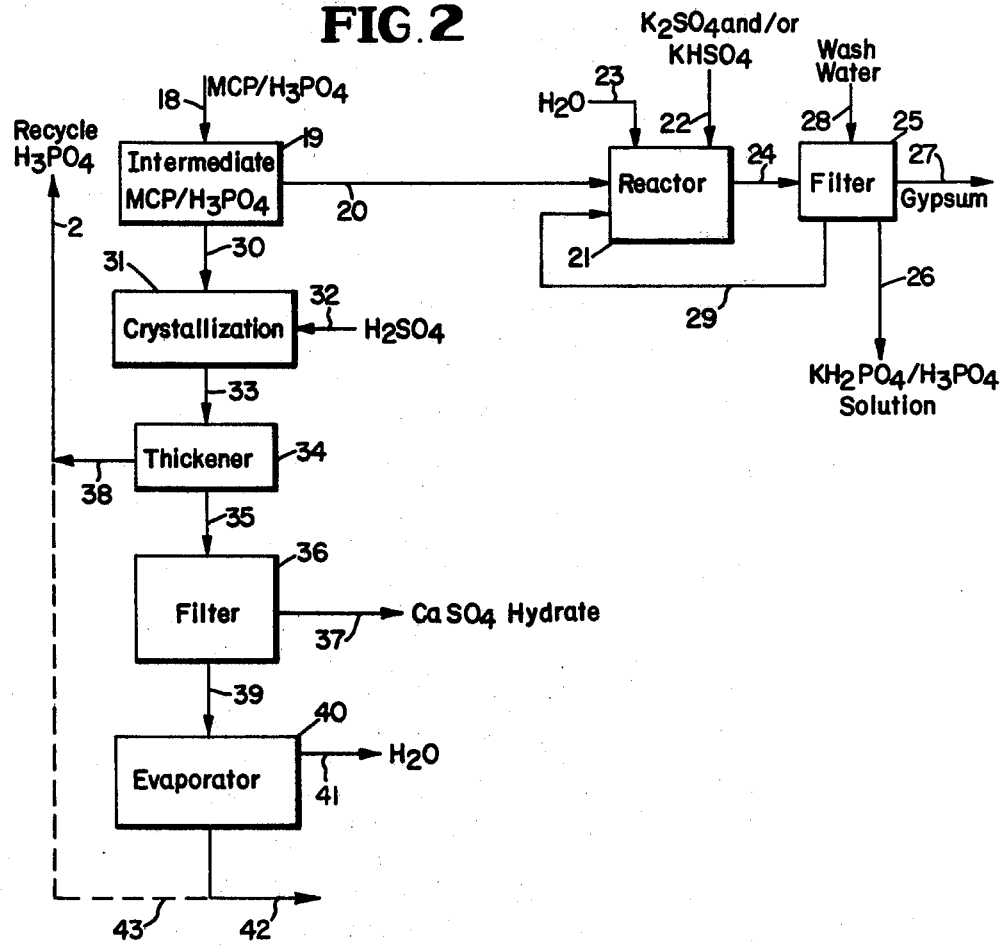

PREPARATION OF MONOCALCIUM PHOSPHATE AND PHOSPHORIC ACID

CROSS REFERENCE TO RELATED APPLICATIONS

This application is a continuation-in-part of U.S. application Ser. No. 870,814, filed Jan. 19, 1978, which is a division of U.S. application Ser. No. 608,973, filed Aug. 29, 1975, now U.S. Pat. No. 4,086,322, issued Apr. 25, 1978, which in turn is a continuation-in-part of Ser. No. 512,877, filed Oct. 7, 1974, now abandoned.

BACKGROUND OF THE INVENTION

1. Field of the Invention

This invention relates to a method for the production of monocalcium phosphate and phosphoric acid by the acidulation of phosphate rock with phosphoric acid in the presence of silicon dioxide and potassium ion wherein fluorides are converted to potassium fluosilicate and the calcium is converted to monocalcium phosphate from which potassium dihydrogen phosphate may be formed.

2. Description of the Prior Art

Phosphoric acid plants are currently operated utilizing a basic and well known process for the acidulation of phosphate rock which comprises reaction of the rock with sulfuric acid to form phosphoric acid with subsequent reaction of the phosphoric acid, with for example ammonia to produce monoammonium phosphate (MAP) and diammonium phosphate (DAP). The phosphoric acid formed in this process is called wet process phosphoric acid. In this reaction, a by-product is gypsum having the chemical formula $CaSO_4.2H_2O$. Essentially, all phosphate rock contains some fluoride, normally in the 3.0% to 4.0% range, and the acidulation reaction usually generates gaseous fluorides. In recent years, both air and water pollution laws and regulations have become more stringent and are now being enforced more rigorously thus requiring that fluoride evolution from such plants be halted. Operating companies have had many pollution problems with fluorine emission into the atmosphere and with the by-product gypsum from these phosphoric acid plants. Thus, an important problem in the operation of these wet process phosphoric acid plants has been in the expensive methods for handling the large amounts of fluorine compounds which are liberated in the gaseous and aqueous effluents from such plants. It is only in recent years that studies have been made on the effects of fluorides contained in the final product and indications seem clear that they may have a deleterious effect on the long range producing ability of the soil when present in fertilizers. See for example Kudzin et al., *Chem. Ab.*, 73, 870534 (1970).

In these systems, any conventional wet process phosphoric acid technology accomplishes two primary objectives, namely: (1) phosphate rock acidulation, and (2) the growth of readily filterable calcium sulfate crystals either as the dihydrate (gypsum), or as the hemihydrate. Conventional phosphoric acid technology carries out both of these objectives essentially simultaneously which leads to a number of environmental and purification problems almost immediately. The presence of strong sulfuric acid in the acidulation phase releases fluorides as HF, $SiF_4$, and/or $H_2SiF_6$. This poses serious fluoride emmission and subsequent recovery problems. Furthermore, unless excess sulfate levels are carefully and closely controlled, minute gypsum crystals can and will blind rock particles and usually result in poor $P_2O_5$ recovery. The presence of free $H_2SiF_6$ in the acid system leads to severe scaling and excessive maintenance costs even with improved design features to minimize this effect.

There is a great deal of art related to attempts to remove the fluoride values from fluorine-containing phosphate rock in the operation of a phosphoric acid plant including methods for suppressing the evolution of fluoride values in the operation of a process and/or attempting to scrub the fluorine from effluent gases and waste water. Two such methods are described in U.S. Pat. No. 2,954,275 and 2,976,141 to Carothers et al. which use sodium or potassium compounds to suppress the fluorides so that they are concentrated in the gypsum cake. However, these processes were conducted in the presence of sulfuric acid in the acidulation reactor and the process had incomplete control on fluoride decomposition and evolution during acidulation.

Other prior art patents have been noted which have also attempted to overcome the problem of fluorine evolution and the reduction of the amount of fluorine contained in final products. A reference of this type is British Pat. No. 735,086 (1955), which discloses the acidulation of phosphate rock by a two step procedure using a strong mineral acid such as nitric acid or hydrochloric acid. In a similar process, in U.S. Pat. No. 3,431,096 to Hill et al., a process is disclosed for reducing evolution of fluoride values in formation of triple superphosphate fertilizer by reaction of phosphate rock and phosphoric acid wherein ammonia or urea is added to suppress the fluorine evolution. However, in this patent, there is no provision for removal of the fluorine values from the product and therefore even if the fluorine evolution is prevented, the fluorine values will be retained in the resulting product and therefore distributed to the soil when it is used as a fertilizer.

In a series of patents issuing from the mid-1940's to early 1960's, there are disclosed processes for the defluorination of phosphate rock and the production of defluorinated calcium phosphates. In these U.S. Pat. Nos. 2,337,498, 2,442,969, 2,893,834, and 2,997,367, the defluorination reaction is carried out by subjecting a mixture of phosphate rock, phosphoric acid and an alkali metal material to calcination, that is by reaction at temperatures as high as 1000° C. to 2200° C. Obviously, under these conditions, the fluorine would be evolved rapidly, or if not evolved, certainly will remain in the final product, said to be an animal feed.

Two additional patents of pertinence to processes of this type are U.S. Pat. Nos. 2,567,227 and 2,728,635 to Miller which disclose the acidulation of phosphate rock with phosphoric acid to form monocalcium phosphate, cooling to crystallize the monocalcium phosphate and then converting it to dicalcium phosphate by disproportionation. In the earlier patent, it is indicated that the fluorine in the rock is vaporized in the system, circulates throughout the system and/or leaves the system with the calcium phosphate. The latter patent indicates that the process of U.S. Pat. No. 2,567,227 provided a final calcium phosphate product having a fluorine content too high to be of animal feed grade. The solution to this problem in the later patent was the addition of some dilute sulfuric acid in the acidulation step which would, of course, lead to additional fluorine evolution during the first step.

There are also patents known in the art which indicate that it is known to acidulate phosphate rock with phosphoric acid and to then recover solid monocalcium phosphate by cooling of the resulting solution and recovering the monocalcium phosphate. Processes of this type are disclosed for example in U.S. Pat. Nos. 3,494,735 and 3,645,676. In addition, U.S. Pat. Nos. 3,619,136 and 3,792,151 to Case disclose the reaction of phosphate rock with recycle phosphoric acid at temperatures of about 125°–180° F. (52° C. to 83° C.) to form a solution of monocalcium phosphate, reacting the latter solution with sulfuric acid to produce phosphoric acid and calcium sulfate, precipitating the calcium sulfate, and recycling a portion of the phosphoric acid to the phosphate rock reaction. These patents point out that under the conditions recited, fluorides are not evolved but remain primarily unreacted and may be found with insoluble materials although a portion remains in the phosphoric acid solution product. Thus the products would be contaminated with fluorides. It is also known to react phosphate rock or a solubilized form with sulfuric acid and $KHSO_4$ in combination with other steps and this reaction is described in U.S. Pat. Nos. 3,697,246 and 3,718,253.

A further pertinent patent is U.S. Pat. No. 4,026,995, issued May 31, 1977 to Case, which teaches the defluorination of wet process phosphoric acid by adding a source of calcium phosphate to form fluosilicates, removing the gypsum formed, and then hydrolyzing the fluosilicates to calcium fluoride, phosphoric acid and silicon dioxide. This patent however, does not contemplate the presence of alkali metal ion in the system, and in fact, states that the prior art has been unsuccessful in this art when alkali metal silicofluorides of low commercial value are precipitated.

Other patents in the phosphoric acid and fluoride art suggest methods for use of scrubbing and recycling plants in an effort to contain or convert the fluorides evolved so that as much as possible of the fluorine can be recovered. Nevertheless, in all of these earlier aproaches to the problem, provisions are never made for eliminating or minimizing the substantive amounts of fluoride contained in the final product nor are these provisions made for converting the fluorides to useful products.

It is also known from an article by Pozin et al., Chemical Abstracts, Vol. 77, No. 141900V, 1972, abstracted from Agrochemie 1972, 12 (6), 164–6, and by Ivanov et al., in Journal of Applied Chemistry of the USSR, Vol. 50, No. 6, pp. 1151–3 (1977), that phosphoric acid can be produced from apatite materials such as phosphate rock by decomposition of the rock with phosphoric acid in the presence of soda to liberate fluoride compounds in the form of $Na_2SiF_6$. The calcium in the solution is then precipitated by adding sulfuric acid to form gypsum.

In my above-identified copending U.S. patent applications, there are disclosed processes by which phosphate rock may be acidulated with phosphoric acid in the presence of potassium ion and silicon dioxide. These processes provide effective procedures for the elimination of fluoride evolution. The present invention is a departure from these prior processes and provides for more economic utilization of potassium fluosilicate in the system wherein both phosphoric acid and potassium ion are regenerated and reused as essential reactants. Thus, the present invention provides a more economical and advantageous process for the commercial area.

It is to be appreciated therefore, that the process of the invention provides an improvement over the processes of the references discussed herein and all other references of which applicant is aware. The present invention provides a system which substantially eliminates the problem of the fluorine evolution in the acidulation of fluorine-containing phosphate rock with phosphoric acid, the recovery of useful products from the acidulation reaction and the recovery of the fluorine contained in the rock in a usable form. Therefore, the present invention provides a unique combination of steps and advantages not appreciated heretofore in the prior art.

SUMMARY OF THE INVENTION

It is accordingly one object of this invention to produce relatively pure phosphoric acid and relatively pure monocalcium phosphate which are essentially free of fluorides, iron, aluminum, magnesium and other impurities.

A still further object of this invention is to produce relatively pure potassium phosphates and pure phosphoric acid from phosphate rock in such manner as to eliminate or greatly reduce $K_2O$ losses and yet recover the fluorides in usable form.

A still further object of this invention is to provide a multi-step process for the treatment of phosphate rock in such manner as to concentrate insoluble fluoride compounds in recoverable form so that they can be processed for fluorine and $K_2O$ recovery and reuse, and minimize contamination of the environment and final products by the presence of fluorine compounds.

An even further object of the present invention is to provide a process wherein phosphoric acid, fertilizer products comprising $KH_2PO_4$, as well as fluoride-containing products such as calcium fluoride, are provided by a continuous process wherein fluoride evolution is minimized and production of undesired by-products essentially eliminated.

A further object of the invention is to provide a process wherein phosphoric acid is produced by the acidulation of phosphate rock, together with the production of fertilizer products, valuable fluoride-containing products, and wherein $K_2O$ is regenerated from the fluoride products for reuse in fluoride elimination from the phosphate rock feed.

Other objects and advantages of the present invention will become apparent as the description thereof proceeds.

In satisfaction of the foregoing objects and advantages there is provided by this invention a method for the acidulation of phosphate rock and the production of phosphoric acid and monocalcium phosphate which may subsequently be converted to potassium dihydrogen phosphate, a valuable fertilizer, as well as the recovery and isolation of the fluoride compounds initially as $K_2SiF_6$ and ultimately as calcium fluoride. This process comprises in its broadest embodiment, the acidulation of phosphate rock in the presence of added silicon dioxide and recycle phosphoric acid which contains potassium ions, the reaction being conducted to produce monocalcium phosphate in phosphoric acid solution while converting the fluorides to insoluble potassium fluosilicate. The resulting slurry is then thickened to produce a clarified solution of monocalcium phosphate in phosphoric acid and a concentrated suspension comprising monocalcium phosphate in phosphoric acid which will contain the slimes and fluosilicate insolubles from the reaction. The concentrated suspension of the fluosilicates which still contains monocalcium phosphate and phosphoric acid, is hydrolyzed to regenerate $K_2O$ for recycle in the process of fluoride elimination in the acidulation of phosphate rock. The clarified monocalcium phosphate/phosphoric acid solution may then be reacted with $K_2SO_4$, $KHSO_4$, or mixtures thereof to produce potassium dihydrogen phosphate and phosphoric acid. A major portion of the monocalcium phosphate/phosphoric acid solution is reacted with sulfuric acid to precipitate calcium sulfate hydrate which is removed from the system, and phosphoric acid, a portion of which may be removed as product, with the balance being recycled to the acidulation reactor as determined by material balance considerations.

BRIEF DESCRIPTION OF THE DRAWINGS

Reference is now made to the drawings accompanying this application which are diagrammatic flow sheets wherein:

FIG. 1 shows the main embodiment of the process of this invention; and

FIG. 2 shows alternative embodiments for further processing of the monocalcium phosphate/phosphoric acid product.

DESCRIPTION OF THE PREFERRED EMBODIMENTS

As indicated above, this invention is concerned with a multi-step procedure for the preparation of essentially fluoride-free products, preferably alkali metal phosphates and phosphoric acid, by the acidulation of phosphate rock, which procedure is conducted in the substantial absence of fluorine pollution and wherein the fluorides may be recovered in usable form, and wherein phosphoric acid may be regenerated for reuse in the system and/or separated as product.

As is known, most of the commercially important phosphate ores mined in this country, and particularly those mined in Florida, contain 3-4% fluorine after beneficiation. The fluorine is a constituent of fluoapatite which is commonly expressed as $Ca_9(PO_4)_6.CaF_2$ and may also be present as calcium fluosilicate ($CaSiF_6$). Silica is a component of phosphate rock and is usually abundant in most grades of rock that are commonly used in the production of wet process phosphoric acid. In usual processes the fluorine compounds in the phosphate rock react with sulfuric acid during the attack on the rock so that the fluorine appears in vapor form as hydrofluoric acid (HF), silicon tetrafluoride ($SiF_4$), or other gas, and in the phosphoric acid solution as fluosilicic acid ($H_2SiF_6$) and/or fluosilicate salts or other forms. Acids from a rock low in reactive silica may also contain free hydrogen fluoride. The present invention is considered to provide a significant solution to problems of fluoride pollution by providing a procedure for minimizing fluoride evolution while recovering substantially all of the fluorides in usable form thereby preventing the fluorides from contaminating the environment and desired products. The present invention also provides a series of substantially purer and useful products as well as novel procedures for obtaining these products without pollution.

As pointed out above, in one aspect, the process of this invention is concerned with the preparation of alkali metal phosphates and/or phosphoric acid and in a main embodiment of the invention, the alkali metal phosphate is an alkali metal dihydrogen phosphate. A preferred product is $KH_2PO_4$ and/or its admixture with phosphoric acid, which contain high plant food nutrients, and is highly valued as a fertilizer. $NaH_2PO_4$, an alternative product, is widely used in the detergent industry and other areas. However, potassium products are preferred and the reaction is described with respect to potassium reactants and products. The process of the present invention is carried out in a continuous manner in the optimum embodiment.

In the initial step of the process of this invention, phosphate rock from any origin, but usually of the type described above containing at least some fluorides, is acidulated with a solution of phosphoric acid containing potassium ion recycle values from room temperature up to about 95° C., and preferably about 70° to 90° C., for a sufficient time to achieve substantially complete acidulation, usually about ½ to 4 hours depending on the reaction temperature and using a sufficient amount of the phosphoric acid solution to completely solubilize the calcium phosphate formed. Sufficient potassium ion is present in the mixture to cause precipitation of the fluorides as a precipitate, primarily as $K_2SiF_6$ together with $SiO_2$ and impurities. In the preferred embodiment, the potassium ion values are provided by $KH_2PO_4$ salts contained in recycle phosphoric acid solution.

In conducting this initial step, the phosphoric acid solution is utilized in sufficient excess to effect substantially complete acidulation and solubilization of the calcium in phosphate rock. The $P_2O_5$ content of the phosphoric acid should range from about 20-55% and preferably about 25-40% by weight. In general, there should be used an excess of phosphoric acid and preferably about 35 to 90 moles of phosphoric acid for each 6 moles of phosphate in phosphate rock, or a molar ratio of $P_2O_5$ in the acid to $P_2O_5$ in the rock, of about 6:1 to 15:1, respectively. Also, about 1.0 to 10 moles of $K_2O$, preferably more than about one mole, to provide a slight excess of $K_2O$, should be present for each three moles of phosphate rock of the formula $Ca_9(PO_4)_6.CaF_2$. The $K_2O$ or potassium ion is preferably added as $KH_2PO_4$.

As pointed out, the phoshoric acid is present in sufficient amounts to solubilize the calcium phosphate contained in the phosphate rock. Further, the $K_2O$ values such as the $KH_2PO_4$ salt are contained in the phosphoric acid in a sufficient amount to precipitate the fluorides present as dense crystalline solids which may be recovered readily. Thus, during the acidulation step, while the calcium phosphates are solubilized, there is precipitated a mixture of solids from which the fluorides may be recovered. This precipitate contains the fluorides essentially as $K_2SiF_6$.

It is to be appreciated that the use of phosphoric acid as the treating acid to acidulate the phosphate rock represents an important embodiment of the invention. In this regard, the phosphoric acid used is to be distinguished from the stronger mineral acids such as sulfuric acid, nitric acid, hydrochloric acid, and the like. As is shown in many standard reference books, phosphoric acid has a weaker ionization constant than mineral acids of the type mentioned. By use of the term phosphoric acid, it is meant that it is an acid that is ionized at less than 90% at a strength of concentration of 0.1 Normal. By this criteria, phosphoric, acid is considered to be a moderately strong rather than a strong acid. Under the same definition, sulfuric acid, nitric acid and hydrochloric acid are ionized at 0.1 Normal concentrations at 90%, 92%, 93%, respectively, and are considered to be strong acids. Another criteria of defining acidic strength is by ionization constant. Thus, the phosphoric acid and any equivalent acid employed in the reaction of this invention will have an ionization constant of no more than $7.5 \times 10^{-3}$.

In conducting the initial step of the reaction, the phosphate rock and phosphoric acid are reacted in the presence of reactive silica. There is also present a recycle solution comprising a solution of potassium dihydrogen phosphate and phosphoric acid. In general, there is sufficient potassium ion and reactive silica present in this initial reactor to convert fluorides contained in phosphate rock to potassium fluosilicate.

The silica added during the reaction of this invention may be amorphous silicon dioxide in any suitable form so long as it is not deleterious to the reaction under consideration. The silica is preferably obtained from materials combination with the phosphate rock, such as slag, or commercially available products such as those sold under the tradename "Dicalite," sold by Grafco Corporation.

The product resulting from the initial reaction comprises a relatively low concentration of suspended solids (e.g., in the range of 3 to 15 wt.%), in the solution of monocalcium phosphate and phosphoric acid. This mixture is preferably passed to a thickener for separation of the solids and solution to produce a clarified monocalcium phosphate solution. This clarified monocalcium phosphate may then be treated as described herein to produce phosphoric acid and/or potassium dihydrogen phosphate.

An important feature of the invention is the utilization of the calcium ion from phosphate rock to remove fluorides as $3CaF_2$ and/or $3CaF_2/SiO_2$ and thereby eliminate the need of using an external source of calcium such as limestone. While the potassium ion is a critical component of this system, it is not consumed, but simply recycled to perform the required fluoride removal function. As a consequence, the cost of $K_2O$ in fluoride removal is no longer a significant factor since only makeup $K_2O$ will be needed as governed by losses.

It is also within the scope of the invention to utilize an external source of phosphoric acid and/or an external source of $K_2SiF_6$ in the initial acidulation reaction. However, in the preferred embodiment, recycle of these materials is especially preferred for purposes of economics.

The underflow, when a thickener is used, is a slurry of monocalcium phosphate/phosphoric acid solution which contains the fluorides, usually as potassium fluosilicate, and any slimes. A feature of this invention is that this mixture is hydrolyzed, preferably by heating at 100°–115° C. or up to the reflux point, to form potassium dihydrogen phosphate in phosphoric acid and convert the fluorides to calcium fluoride and silicon dioxide. As shown, this hydrolysis reaction proceeds as illustrated by the following equation:

$$3Ca(H_2PO_4)_2 + 10H_3PO_4 + K_2SiF_6 + R_2O_3/P_2O_5 + 2 H_2O \rightarrow SiO_2/3CaF_2 + R_2O_3/P_2O_5 + 2KH_2PO_4 + 14H_3PO_4$$

wherein R is a metal such as Fe or Al.

As may be seen from this equation, the fluorides, in the form of $K_2SiF_6$, are converted to $SiO_2/3CaF_2$ as a solid in admixture with $Al_2O_3$, $Fe_2O_3$, etc. This solid mixture is separated from the solution of $2KH_2PO_4 +$ $14H_3PO_4$ and valuable fluorides may be recovered from the solids as described herein.

The resulting solution is suitable for recycle to the system to provide at least a portion of the potassium ion necessary to produce additional potassium fluosilicate and also provide a source of phosphoric acid. As a result, some of the $SiO_2$ and $K_2O$ are not consumed in the reaction but rather are recycled in the continuous process. It is, of course, to be understood that additional amounts of potassium ion and $SiO_2$ from external sources may be added to the acidulation reactor as may be required by the system. An external source of phosphoric acid may also be used.

In one embodiment, a portion of the resulting clarified monocalcium phosphate and phosphoric acid solution is reacted with potassium sulfate, potassium bisulfate or mixtures thereof to produce $KH_2PO_4/H_3PO_4$ solutions from which $KH_2PO_4$ may be recovered as a fertilizer grade material. Phosphoric acid may also be produced in this embodiment and may be recovered or recycled as makeup phosphoric acid.

The remaining monocalcium phosphate/phosphoric acid solution is reacted with sulfuric acid to produce calcium sulfate hydrate which may be recovered and the phosphoric acid regenerated as a result of this reaction may be recovered as product and/or recycled to the main reactor to effect acidulation of the phosphate rock feed.

The essential steps described above for the reaction provide a number of advantages in the process. Thus the process serves to regenerate valuable hydrogen ions as illustrated by the following equation:

$$K_2SiF_6 + 3Ca(H_2PO_4)_2 + 10H_3PO_4 \longrightarrow$$

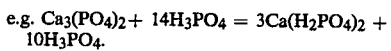

Thus the phosphoric acid concentration increases from 10 to 14 moles or an increase of 40%. More importantly, this 14 moles of free $H_3PO_4$ can now accommodate additional unreacted phosphate rock. In effect, approximately 3CaO/3OCaO or 10% of the original rock feed can be acidulated in this manner;

e.g. $Ca_3(PO_4)_2 + 14H_3PO_4 = 3Ca(H_2PO_4)_2 + 10H_3PO_4.$

The process of the invention also removes unreacted phosphate rock from the acidulation reaction and subjects this rock to much more vigorous acidulation conditions to provide: a) increased phosphate acid concentration as illustrated above, and b) increased temperatures from 80°–90° C. The process accomplishes these functions using a relatively modest defluorination/hydrolysis loop which is only 10% of the main loop or system. Further it permits recovery of the considerably more dense Fluorspar component, and will also separate unhydrolyzed $K_2SiF_6$ with the $CaF_2$. In this instance, subsequent treatment with $NH_4OH$ can be utilized to produce a chemical grade Fluorspar. The process also eliminates the $R_2O_3$ component after removal of the dense $CaF_2/K_2SiF_6$ components — preferably by the addition of clean gypsum to assist in the separation (centrifuge) step and to simulate the 0-20-0 NSP grade. The 110°–115° C. temperatures involved in hydrolysis will help flocculate the $R_2O_3$ component and simplify separation.

Reference is now made to FIG. 1 accompanying the application wherein there is shown a schematic diagram of the main embodiment of the process of the present invention. In the drawing, phosphate rock from line 1 and phosphoric acid from line 2 are reacted in acidulation reactor 3. The reaction is conducted at a temperature in the range of about 40°-95° C. and the materials are reacted utilizing an excess of the phosphoric acid. The phosphoric acid contains potassium, usually added as $KH_2PO_4$, in sufficient amounts to react with fluoride contained in the phosphate rock and produce potassium fluosilicate. In addition, reactive silica is added by line 4 to provide sufficient reaction with potassium to form the potassium fluosilicate. In this reactor 3, monocalcium phosphate is formed as a solution in phosphoric acid with an insoluble precipitate comprising slimes and a portion of the potassium fluosilicate. Sufficient phosphoric acid is present to dissolve the monocalcium phosphate.

The reaction mixture is then passed by line 5 directly to defluorination reactor or thickener 6 for removal of the fluorides.

In defluorination thickener 6, a product or underflow is removed which is a slurry of potassium fluosilicate, $SiO_2$ slimes, and other solids in a solution of monocalcium phosphate in phosphoric acid. In accordance with a main embodiment of the invention, the potassium fluosilicate in the slurry is withdrawn by line 7 to hydrolyzer 8. The hydrolysis reaction in hydrolyzer 8 is conducted by heating at a temperature in the range of 100°-115° C. or at the reflux point of the system preferably by introduction of steam at 9, to convert the potassium fluosilicate to silicon dioxide, calcium fluoride, and potassium dihydrogen phosphate and/or phosphoric acid using monocalcium phosphate. The resulting mixture is passed by line 10 to separator 11 where calcium fluoride and some silicon dioxide are recovered at line 12. In a preferred embodiment, the mixture from separator 11 is passed to separator 15 by line 13 after addition of a suitable amount of gypsum by line 13. Thereafter, there is recovered from separator 15 an 0-20-0 fertilizer by line 16 which contains most of the $R_2O_3$ components or slimes. The gypsum is added primarily as substrate to provide a filterable solid 0-20-0 (N-P-K) product, and to facilitate the separation of slimes from the solution in separator 15. $KH_2PO_4/H_3PO_4$ solution, which may contain some $SiO_2$, is then recycled by line 17. While the bulk of the $R_2O_3$ is removed here, it can also be expected that portions will be removed with other products.

In the meantime, the overflow or solution from defluorinator or thickener 6 is recovered in line 18 as a solution of monocalcium phosphate in phosphoric acid. This product may be processed by any of several alternative embodiments to recover valuable products, including monocalcium phosphate, phosphoric acid including recycle $H_3PO_4$, and gypsum, all of which are substantially free of fluoride contamination.

As a result of this process, there is recovered from the defluorinator 6 by line 18 the product from the reaction of this invention. This reaction product comprises a solution of monocalcium phosphate in phosphoric acid, which is a valuable reaction product of high quality substantially free of fluoride contamination. This product solution may be treated by various alternative processing techniques to recover monocalcium phosphate and/or phosphoric acid, which products may also be converted to other valuable products including $KH_2PO_4$ and recycle phosphoric acid. Preferred further processing techniques are shown in FIG. 2.

In the embodiment of FIG. 2, the monocalcium phosphate/phosphoric acid solution product from line 18 is passed to intermediate storage 19 where the stream may be divided into two portions for further processing. The division of the $MCP/H_3PO_4$ stream at this point may be in a desired ratio, e.g., about 40 to 60 wt. % of the stream may be removed, and processed to recover $KH_2PO_4/H_3PO_4$. In this aspect, a portion of the stream is withdrawn by line 20 and passed to reactor 21. In reactor 21, the stream is reacted with a potassium sulfate reactant such as potassium sulfate, potassium hydrogen sulfate or a mixture thereof, added by line 22. The potassium sulfate reactant may be added as a solid or aqueous solution and is added in sufficient stoichiometric amounts to react with all the monocalcium phosphate present. As necessary, for solution purposes, water may be added by line 23. This reaction is conducted at a temperature of about 50° to 100° C. with agitation.

In reactor 21, the monocalcium phosphate and potassium sulfate react to produce potassium dihydrogen phosphate as product together with gypsum and phosphoric acid as illustrated by the following equation when the reactant is potassium sulfate:

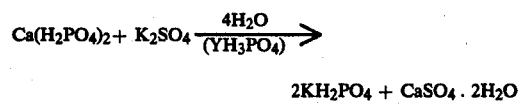

$$2KH_2PO_4 + CaSO_4 \cdot 2H_2O$$

where Y is the amount of phosphoric acid in the system.

The resulting reaction slurry is then transferred by line 24 to separator or filter 25 and a solution of $KH_2PO_4$ in phosphoric acid is removed by line 26 and the gypsum is removed by line 27. The solid filter cake is washed by water from line 28 and the wash water may be recycled by line 29 to reactor 21.

The product recovered at line 26 contains potassium dihydrogen phosphate and has a fertilizer value of 0-24-6. The $KH_2PO_4$ may be recovered from this solution by evaporation and precipitation with a water miscible solvent such as methanol or extraction with a water immiscible solvent such as butanol.

In the meantime, the other portion of the clarified monocalcium phosphate/phosphoric acid solution from intermediate storage 19 is passed by line 30 to crystallizer 31 and reacted with at least a stoichiometric amount of sulfuric acid from line 32. The sulfuric acid reacts with the $MCP/H_3PO_4$ solution to produce phosphoric acid and calcium sulfate hydrate and this slurry is passed by line 33 to thickener 34 wherein concentration of the slurry is achieved and the underflow slurry is then passed by line 35 to filter 36. The solid calcium sulfate hydrate in substantially pure form is recovered by line 37.

After removal of the calcium sulfate hydrate, the phosphoric acid solution/filtrate is transferred by line 39 to evaporator 40 where water is removed from the system at 41 as required. The remaining phosphoric acid may then be recovered as product by line 42 or may be combined with line 38 overflow from thickener 34 via dotted line 43 to meet the recycle phosphoric acid needs of line 2 in the phosphate rock acidulation carried out in reactor 3.

In a further embodiment of the present invention (not shown), the monocalcium phosphate/phosphoric acid solution may be processed to recover solid monocalcium phosphate from the phosphoric acid and each product may then be recovered or further processed. In one aspect, the monocalcium phosphate/phosphoric acid clarified solution from defluorinator 6 is passed to a crystallizer. Up to this point, the monocalcium phosphate/phosphoric acid solution has been maintained at a temperature in the range of 80°–95° C. to maintain the solution. However, in the crystallizer, the solution is cooled via evaporation to about 25°–55° C., preferably about 40° C., to cause crystallization of solid monocalcium phosphate from the phosphoric acid solution. Therefore, it is preferred that the mixture be cooled by a temperature difference of about 35°–55° C. The resulting slurry is then passed from the crystallizer to a separator where a separation is effected between solid monocalcium phosphate and the mother liquor $MCP/H_3PO_4$. The solid monocalcium phosphate from the separator is then passed, for example to reactor 21, wherein reaction is carried out with a potassium sulfate reactant such as potassium sulfate, potassium hydrogen sulfate, or a mixture thereof as described above for the $MCP/H_3PO_4$ solution. In this reactor 21, the monocalcium phosphate and $K_2SO_4$ and/or $KHSO_4$ reactant produce potassium dihydrogen phosphate and/or phosphoric acid as a product together with gypsum. The resulting mixture is then filtered and the gypsum removed by line 27. The product recovered at line 26 is an aqueous solution of potassium dihydrogen phosphate and/or phosphoric acid. This solution may be further processed into desired products.

In this reaction, the monocalcium phosphate reacts with the potassium sulfate or potassium hydrogen sulfate as illustrated by the following equations:

$$8Ca(H_2PO_4)_2 + 8K_2SO_4 \rightarrow 16KH_2PO_4 + 8CaSO_4 \cdot 2H_2O \quad (a)$$

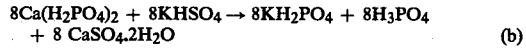

$$8Ca(H_2PO_4)_2 + 8KHSO_4 \rightarrow 8KH_2PO_4 + 8H_3PO_4 + 8CaSO_4 \cdot 2H_2O \quad (b)$$

In reaction (a) with $K_2SO_4$, the $KH_2PO_4$ product is a liquid 0-15-10 fertilizer which may be further concentrated, and in reaction (b) with $KHSO_4$, the $KH_2PO_4/H_3PO_4$ product is a liquid 0-24-8 fertilizer.

In the meantime, the MCP/phosphoric acid from the separator is passed to the calcium sulfate hydrate crystallizer and reacted with sulfuric acid to produce phosphoric acid product and/or recycle mother liquor and calcium sulfate hydrate as described above for the process of FIG. 2. This reaction for recycle is illustrated by the following equation:

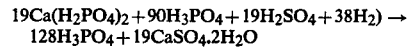

$$19Ca(H_2PO_4)_2 + 90H_3PO_4 + 19H_2SO_4 + 38H_2) \rightarrow 128H_3PO_4 + 19CaSO_4 \cdot 2H_2O$$

The "128 $H_3PO_4$" portion represents the phosphoric acid available for recycle.

It will therefore be understood that this approach also leads to valuable fertilizer products and recycle phosphoric acid.

The following example is presented to illustrate the invention but it is not considered to be limited thereto. In this example and throughout the specification, parts are by weight unless otherwise indicated.

EXAMPLE I

In this example, 1,278 grams (= 9 moles) $P_2O_5$ in phosphate rock are reacted with 10,224 grams (= 72 moles) $P_2O_5$ as 35% recycle phosphoric acid for a $P_2O_5$ (acid) /$P_2O_5$ (rock) weight ratio of 8/1. This reaction mixture provides enough excess phosphoric acid to dissolve essentially all of the calcium in the phosphate rock as monocalcium phosphate wherein the $P_2O_5$/CaO weight ratio should approach 6.75/1. The acidulation reaction is conducted at 80°–90° C. and contains a minimum of 1 mole of $K_2O$ and sufficient external reactive silica ($SiO_2$) to remove substantially all of the fluoride as insoluble potassium fluosilicate. Sand, some $R_2O_3$ slimes and unreacted phosphate rock also remain insoluble. Small amounts (up to 3–4 ppm) of a flocculating agent such as Nalcalite 670 are helpful in the settling the solids from this system.

This thin reaction slurry, still at 90° C., is then separated via a decanter/thickener (separatory funnel may be used in the laboratory) wherein approximately 10% of the $MCP/H_3PO_4$ solution remains with the underflow insolubles. The now thickened slurry, is directed into the hydrolysis sector wherein the temperature is raised to 110°–115° C., e.g., by use of low pressure steam. Under these conditions, the hydrolysis reaction is essentially completed in 1 to 2 hours. The slurry now contains dense crystalline Fluorspar ($CaF_2$) which is readily separated from the unreactive but somewhat flocculated $R_2O_3/P_2O_5$ components such as by a hydraclone or by suitable gravity separation means. Sufficient clean gypsum is then added to the remaining finely dispersed $R_2O_3/P_2O_5$ to achieve a 0-20-0 grade fertilizer which simulates NSP. This requires approximately 3.64 grams of $CaSO_4$ per gram of $P_2O_5$ slimes to be recovered. The $R_2O_3/P_2O_5$ component has already been flocculated/coalesced to a considerable degree during the 110°–115° C. hydrolysis step. However, the utilization of clean gypsum provides additional substrate so that separation of this material presents no undue difficulties. The product is readily separated via suitable means, e.g., a centrifuge or a precoat filter.

After separation of the solids, the remaining solution of $2KH_2PO_4 + 14 H_3PO_4$, which also contains a small amount of silicon dioxide, is recycled to the acidulation reactor as regenerated phosphoric acid containing potassium ion.

EXAMPLE II

The clarified monocalcium phosphate/phosphoric acid overflow from the $K_2SiF_6$ thickener is thus passed to a crystallizer wherein the temperature is lowered to 40° C. to crystallize monocalcium phosphate. The solid monocalcium phosphate and the remaining $MCP/H_3PO_4$ solutions are then separated via a filter, centrifuge or other separator. The solid monocalcium phosphate is removed and reacted with a stoichiometric amount of potassium hydrogen sulfate in an aqueous medium at a temperature of 90° C. In this reaction, the monocalcium phosphate is converted to $KH_2PO_4 + H_3PO_4$ and gypsum. The gypsum is removed and the $KH_2PO_4 + H_3PO_4$ liquor separated and recovered as a 0-24-8 fertilizer solution.

The phosphoric acid solution which still contains monocalcium phosphate from the separator is reacted with sulfuric acid in stoichiometric amounts at 85° C. to produce calcium sulfate hydrate which crystallizes from solution. This solid is then filtered and removed from the system. The resulting phosphoric acid is then recycled to the acidulation reactor.

EXAMPLE III

In an alternative reaction, the solid monocalcium phosphate is reacted with potassium sulfate to yield primarily $KH_2PO_4$ with little or no $H_3PO_4$ coproduct. Conversely, if a portion of the (uncrystallized) $MCP/H_3PO_4$ liquor is reacted with potassium sulfate the resulting $KH_2PO_4/H_3PO_4$ solution will have a plant food value of 0-24-6. A portion of any of the $K_2O$ products may be recycled back to the acidulation vessel to provide makeup for the $K_2O$ lost in the hydrolysis sector.

The invention has been described herein with reference to certain preferred embodiments; however, as obvious variations thereon will become apparent to those skilled in the art, the invention is not to be considered limited thereto.

What is claimed is:

1. A process for the production of monocalcium phosphate and phosphoric acid which comprises acidulating phosphate rock with an excess of phosphoric acid in the presence of added silicon dioxide and potassium ion to produce a first slurry of insoluble potassium fluosilicate in a solution of monocalcium phosphate in phosphoric acid; subjecting this mixture to separation to produce a clarified solution of monocalcium phosphate in phosphoric acid and a second slurry comprising monocalcium phosphate in phosphoric acid which contains insoluble potassium fluosilicate; subjecting said second slurry to hydrolysis at an elevated temperature to regenerate a $KH_2PO_4/H_3PO_4$ solution and produce calcium fluoride and silicon dioxide; recovering the calcium fluoride and silicon dioxide and recycling the $KH_2PO_4/H_3PO_4$ solution to the acidulation reaction.

2. A process according to claim 1 wherein the acidulation of the phosphate rock is carried out at a temperature in the range of about 25°-95° C.

3. A process according to claim 2 wherein the mixture recovered from the acidulation reaction is separated in a decanter/thickener to produce an overflow comprising the clarified solution of monocalcium phosphate in phosphoric acid and an underflow slurry of $K_2SiF_6$ in a solution of monocalcium phosphate and phosphoric acid.

4. A process according to claim 3 wherein the underflow is subjected to hydrolysis by heating at a temperature in the range of about 95° C. to the reflux temperature of the system to convert the $K_2SiF_6$ to calcium fluoride and silicon dioxide.

5. A process according to claim 1 wherein the monocalcium phosphate and phosphoric acid clarified solution is cooled to precipitate at least a portion of the monocalcium phosphate as a solid product, and separating the remaining solution of monocalcium phosphate and phosphoric acid.

6. A process according to claim 5 wherein the solid monocalcium phosphate is reacted with a member selected from the group consisting of potassium sulfate, potassium hydrogen sulfate, and/or mixtures thereof to produce $KH_2PO_4$, $KH_2PO_4/H_3PO_4$ mixtures and gypsum.

7. A process according to claim 5 wherein the solid monocalcium phosphate is reacted with $K_2SO_4$ in aqueous medium to produce $KH_2PO_4$ and gypsum.

8. A process according to claim 5 wherein the solid monocalcium phosphate is reacted with $KHSO_4$ in an aqueous medium to produce a solution of $KH_2PO_4$ in $H_3PO_4$, and solid gypsum.

9. A process according to claim 5 wherein the monocalcium phosphate/phosphoric acid solution is reacted with sulfuric acid to produce gypsum solids and phosphoric acid, the gypsum solids are filtered off and the phosphoric acid is recycled to the acidulation reactor.

10. A process according to claim 1 wherein the clarified solution of monocalcium phosphate in phosphoric acid is divided into two portions for separate processing.

11. A process according to claim 10 wherein one portion of the clarified solution is reacted with a member selected from the group consisting of potassium sulfate, potassium hydrogen sulfate and/or mixtures thereof at a temperature in the range of 60°-80° C. to produce a solution of $KH_2PO_4$ in phosphoric acid and insoluble gypsum.

12. A process according to claim 10 wherein the remaining portion of clarified solution is reacted with sulfuric acid to produce gypsum solids and phosphoric acid, the gypsum solids are filtered off, and the phosphoric acid is recycled to the acidulation reactor.

13. A process according to claim 1 wherein about 1.0 to 10 moles of potassium ion are present in the acidulation reactor for each three moles of phosphate rock.

14. A process according to claim 13 wherein the potassium ion is added as $KH_2PO_4$.

15. A process according to claim 1 wherein the calcium fluoride is initially separated from the hydrolysis reaction product, gypsum is then added to the remaining mixture, a solid 0-20-0 fertilizer is removed, and remaining solution is recycled to the acidulation reaction.

* * * * *